(12) United States Patent
Lee et al.

(10) Patent No.: US 12,556,647 B2
(45) Date of Patent: Feb. 17, 2026

(54) TV AND CONTROL METHOD THEREOF

(71) Applicant: LG ELECTRONICS INC., Seoul (KR)

(72) Inventors: Jinhee Lee, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/699,867

(22) PCT Filed: Oct. 28, 2021

(86) PCT No.: PCT/KR2021/015313
§ 371 (c)(1),
(2) Date: Apr. 9, 2024

(87) PCT Pub. No.: WO2023/074945
PCT Pub. Date: May 4, 2023

(65) Prior Publication Data
US 2024/0406341 A1    Dec. 5, 2024

(51) Int. Cl.
*H04N 5/64*         (2006.01)
*H04N 21/4223*      (2011.01)
(Continued)

(52) U.S. Cl.
CPC .......... *H04N 5/64* (2013.01); *H04N 21/4223* (2013.01); *H04N 21/44218* (2013.01); *H04N 21/4532* (2013.01)

(58) Field of Classification Search
CPC ................ H04N 5/64; H04N 21/4223; H04N 21/44218; H04N 21/4532; H04N 21/4415;
(Continued)

(56) References Cited

U.S. PATENT DOCUMENTS

2012/0029812 A1* 2/2012 Altwaijry ............... G06Q 10/04
                                              701/531
2012/0056875 A1* 3/2012 Lee ....................... H04N 13/398
                                              345/419
(Continued)

FOREIGN PATENT DOCUMENTS

EP          2481219        8/2012
KR     10-2012-0019326     3/2012
(Continued)

OTHER PUBLICATIONS

PCT International Application No. PCT/KR2021/015313, International Search Report dated Jul. 15, 2022, 4 pages.
(Continued)

*Primary Examiner* — Timothy R Newlin
(74) *Attorney, Agent, or Firm* — LEE, HONG, DEGERMAN, KANG & WAIMEY

(57) ABSTRACT

According to an embodiment of the present invention, a control method of a TV in which an exposed size of a screen is varied by a motor comprises the steps of: controlling the motor so that only part of the screen is exposed; displaying arbitrary content in a state in which only the part of the screen is exposed; when a specific condition for an external device is satisfied by referring to first data stored in a memory, starting shooting by means of a camera installed in the TV; identifying a specific user by referring to second data stored in the memory and a result of the shooting; and depending on the specific identified user, controlling to change the displayed content in the state in which the part of the screen is exposed or to control the motor so that all of the screen is exposed.

8 Claims, 15 Drawing Sheets

(51) Int. Cl.
*H04N 21/442* (2011.01)
*H04N 21/45* (2011.01)

(58) Field of Classification Search
CPC .......... H04N 21/4222; H04N 21/42222; G09F 9/301; G06F 1/1652
See application file for complete search history.

(56) References Cited

U.S. PATENT DOCUMENTS

| | | | | |
|---|---|---|---|---|
| 2012/0092283 | A1* | 4/2012 | Miyazaki | G06F 3/04883 345/173 |
| 2016/0034036 | A1* | 2/2016 | Ahmed | G06F 3/017 345/156 |
| 2016/0119438 | A1* | 4/2016 | Abramson | H04N 21/41407 709/217 |
| 2016/0170593 | A1* | 6/2016 | Lehtiniemi | G06F 3/041 715/781 |
| 2016/0306534 | A1* | 10/2016 | Woo | G09G 5/373 |
| 2017/0161868 | A1* | 6/2017 | Kim | G09F 9/00 |
| 2018/0321757 | A1* | 11/2018 | Jo | H04N 21/422 |
| 2019/0236988 | A1* | 8/2019 | Lin | G09F 9/301 |
| 2020/0169789 | A1* | 5/2020 | Kim | H04N 21/4667 |
| 2021/0181801 | A1* | 6/2021 | Yin | G06F 1/1652 |
| 2023/0244273 | A1* | 8/2023 | Han | G06F 1/1637 345/156 |
| 2024/0414254 | A1* | 12/2024 | Kim | G06F 1/1677 |
| 2025/0013214 | A1* | 1/2025 | Choi | G05B 15/02 |
| 2025/0117045 | A1* | 4/2025 | Wang | G06F 1/1652 |

FOREIGN PATENT DOCUMENTS

| | | |
|---|---|---|
| KR | 1020170006760 | 1/2017 |
| KR | 1020170043347 | 4/2017 |
| KR | 10-2018-0007415 | 1/2018 |
| KR | 1020190022157 | 3/2019 |
| KR | 10-2020-0075809 | 6/2020 |
| KR | 1020210086368 | 7/2021 |
| WO | 2011-037761 | 3/2011 |
| WO | 2021-117949 | 6/2021 |

OTHER PUBLICATIONS

European Patent Office Application Serial No. 21962569.6, Search Report dated Jul. 18, 2025, 12 pages.
Korean Intellectual Property Office Application No. 10-2024-7005523, Office Action dated Aug. 13, 2025, 6 pages.

* cited by examiner

FIG. 6
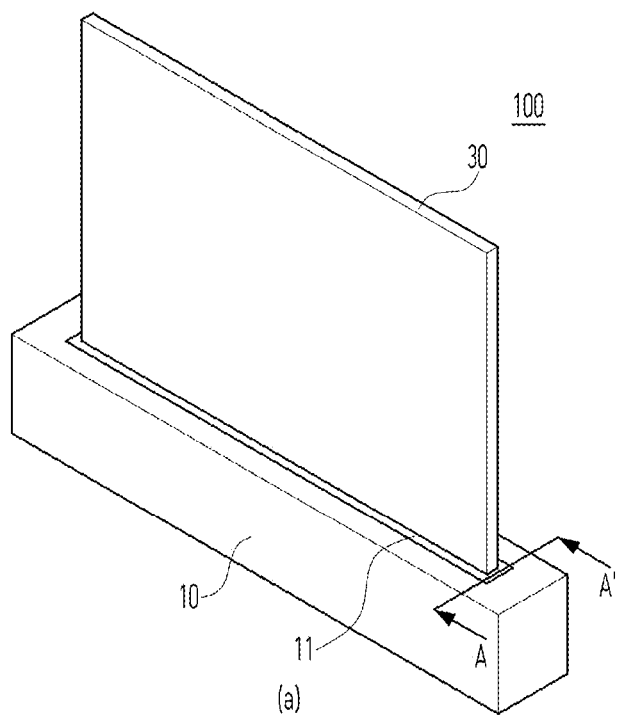
(a)
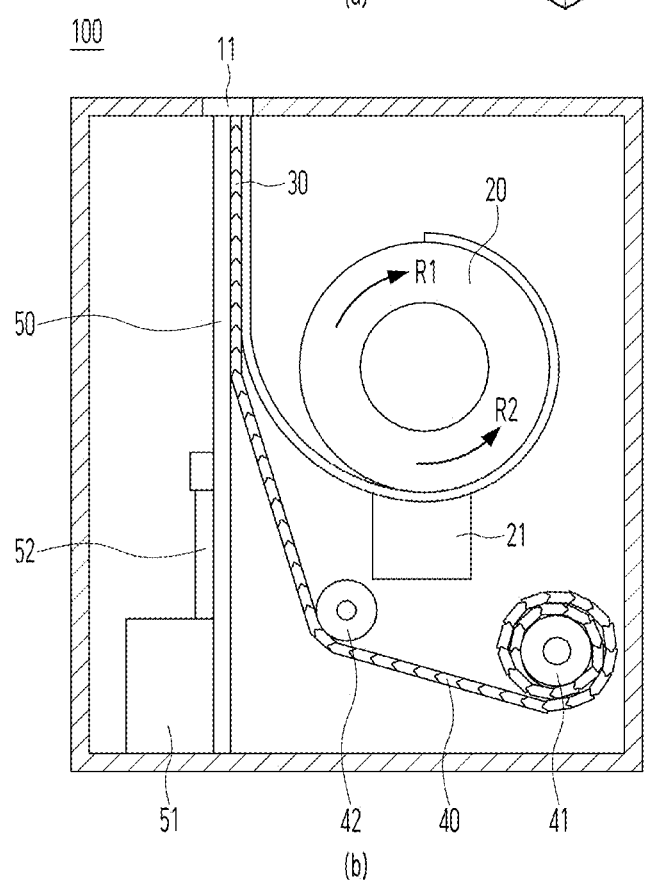
(b)

FIG. 7
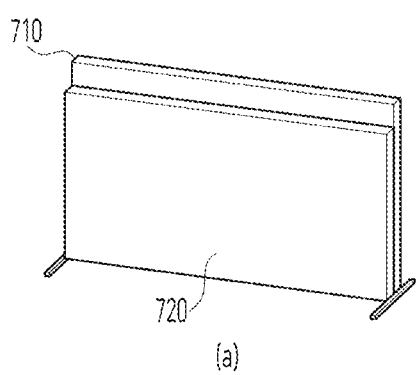
(a)
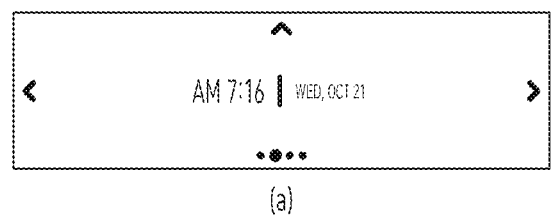
(a)
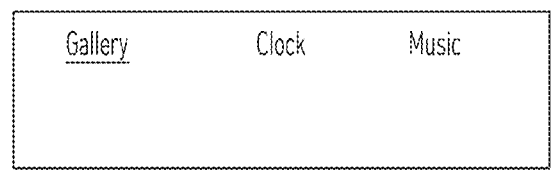
(c)
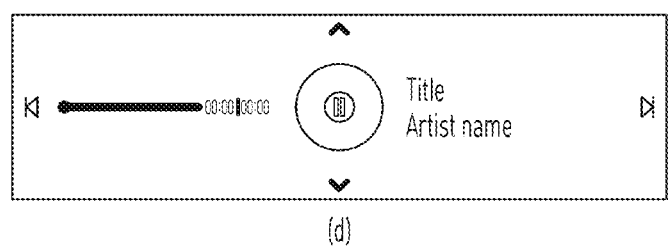
(d)

FIG. 11
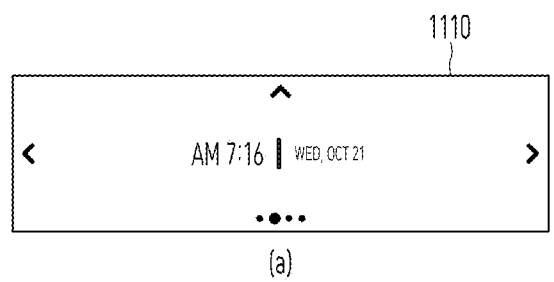
(a)
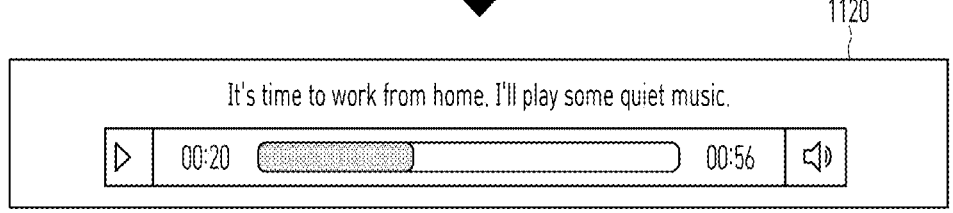
(b)

FIG. 12
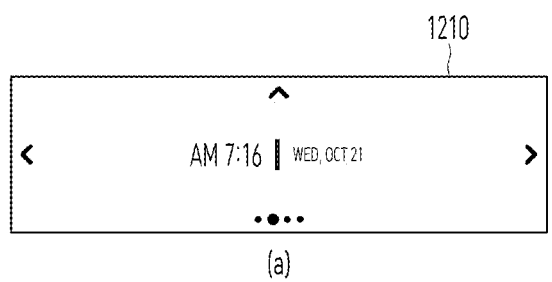
(a)
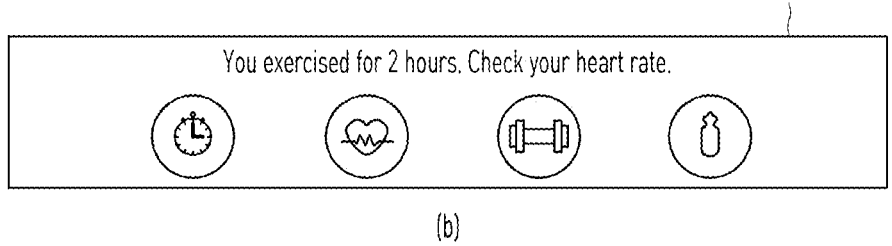
(b)

TV AND CONTROL METHOD THEREOF

CROSS-REFERENCE TO RELATED APPLICATION(S)

This application is the National Stage filing under 35 U.S.C. 371 of International Application No. PCT/KR2021/015313, filed on Oct. 28, 2021, the contents of which are all incorporated by reference herein in its entirety.

TECHNICAL FIELD

The technical field of the disclosure is various multimedia devices with displays. For example, the disclosure is applicable to a television (TV) with a variable size of an exposed screen.

BACKGROUND ART

In a conventional TV, the entire area of a screen is exposed at all times. However, if a black screen is always exposed even when a user is not watching TV, the user may not fully utilize a space. On the other hand, services that use only a portion of a TV screen as a display have not been provided.

To solve this problem, new form factors of TVs are under research.

DISCLOSURE

Technical Problem

An embodiment of the disclosure is intended to provide a system that selectively exposes a portion or all of a screen by using a motor added to a TV.

Another embodiment of the disclosure is intended to specifically define content displayed on a portion or all of a screen in order to minimize the power consumption of a motor added to a TV. As a motor operation is expected to consume more power than in a conventional TV, defining specific content to be displayed in a specific mode is a very important technology.

Another embodiment of the disclosure is intended to provide a technology of more accurately estimating the intention of a user located in the vicinity of a TV with a variable screen size (e.g., on a device type basis).

Technical Solution

A method of controlling a television (TV) in which a size of an exposed screen is changed by a motor according to an embodiment of the disclosure includes controlling the motor to expose only a portion of the screen, displaying any content with only the portion of the screen exposed, when a specific condition for an external device is satisfied referring to first data stored in a memory, starting shooting through a camera installed on the TV, identifying a specific user, referring to second data stored in the memory and a result of the shooting, and changing the content displayed with only the portion of the screen exposed or controlling the motor to expose all of the screen, according to the identified specific user.

A TV in which a size of an exposed screen is changed by a motor according to an embodiment of the disclosure includes a memory storing at least one data, the motor controlling to expose a portion of the screen, a video output module displaying any content, with only the portion of the screen exposed, and a controller controlling the memory, the motor, and the video output module. For example, the controller may control to start shooting through a camera installed on the TV, when a specific condition for an external device is satisfied referring to first data stored in the memory, control to identify a specific user, referring to second data stored in the memory and a result of the shooting, and control to change the content displayed with only the portion of the screen exposed or controls the motor to expose all of the screen, according to the identified specific user.

Advantageous Effects

According to an embodiment of the disclosure, a system for selectively exposing a portion or all of a screen by using a motor attached to a TV is provided.

According to another embodiment of the disclosure, there is the technical effect of minimizing unnecessary power consumption of a TV motor by specifically defining content to be displayed according to the size of an exposed screen.

According to another embodiment of the disclosure, a technology of more accurately estimating the intent of a user located in the vicinity of a TV with variable screen size is advantageously provided on an external device type basis.

BRIEF DESCRIPTION OF THE DRAWINGS

FIG. 6 illustrates a motor for adjusting a screen size of a TV according to an embodiment of the disclosure.

FIG. 7 illustrates an embodiment in which with a portion of a screen of a TV exposed, different content is displayed for a different user according to an embodiment of the disclosure.

FIG. 11 illustrates an embodiment of changing content displayed on a portion of a screen of a TV based on user history information.

FIG. 12 illustrates an embodiment of changing content displayed on a portion of a screen of a TV based on exercise information obtained from an external device.

Best Mode

Figure 1:
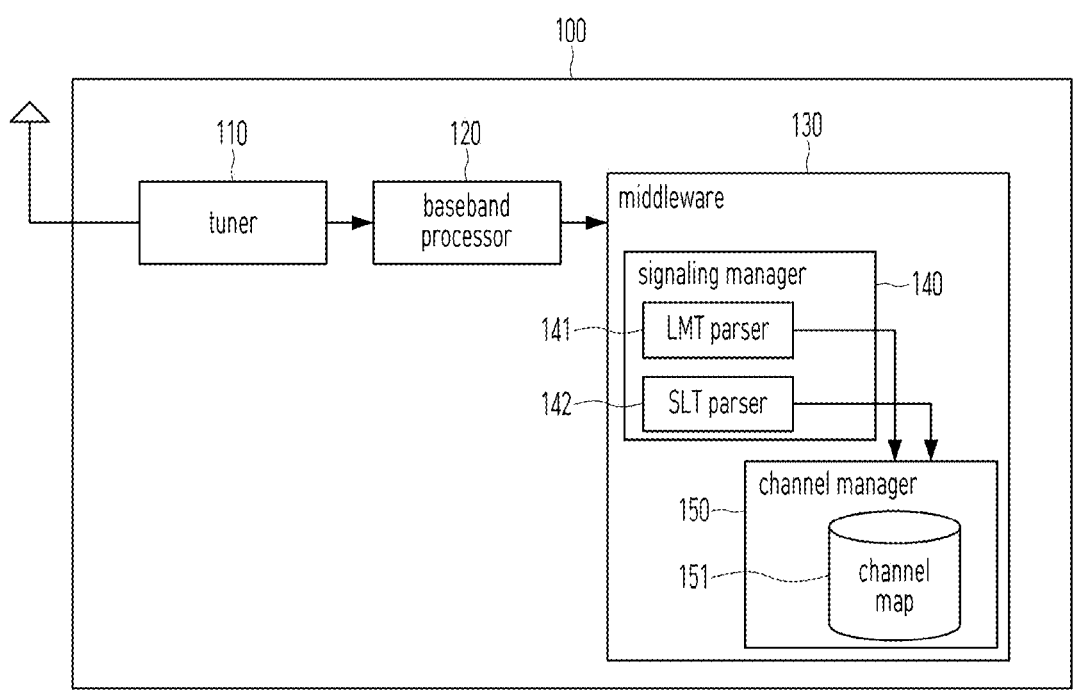
FIG. 1 illustrates internal components of a TV according to an embodiment of the disclosure.

FIG. 1 illustrates internal components of a TV according to an embodiment of the disclosure.

The disclosure is applicable to a variety of TV products, for example, the European standard, Digital Video Broadcasting (DVB) or the North American/Korean standard, Advanced Television Systems Committee (ATSC) 3.0.

However, although an exemplary process of performing an initial service scan operation by a TV 100 in conformance to the ATSC 3.0 standard is described with reference to FIG. 1, the scope of the disclosure should be determined in accordance with the appended claims.

A tuner 110 determines whether a signal is present, using a predetermined list of frequencies. Upon detection of a signal at a given frequency, a baseband processor 120 extracts L1 signaling of a preamble.

Further, the baseband processor 120 may transmit physical layer pipe (PLP) data including link layer signaling and low level signaling (LLS) to middleware 130, and the middleware 130 may extract the link layer signaling and the LLS from the PLP data.

The middleware 130 includes a signaling manager 140 and a channel manager 150.

After receiving the PLP data including the link layer signaling and the LLS from the baseband processor 120, the middleware 130 passes the data to an appropriate parser.

For example, the middleware 130 extracts a link mapping table (LMT) from the link layer signaling and passes the LMT to an LMT parser 141. Further, the middleware 130 extracts a service list table (SLT) from the LLS and passes the SLT to an SLT parser 142.

The LMT parser 141 parses the LMT and extracts first information (e.g., a PLPID, session information (an IP address and a port number), and so on) required to generate a channel map.

The SLT parser 142 parses the SLT and extracts second information (e.g., a service id, a service name, and so on) required to generate the channel map.

The extracted first and second information are stored in a channel map 151.

Figure 2:
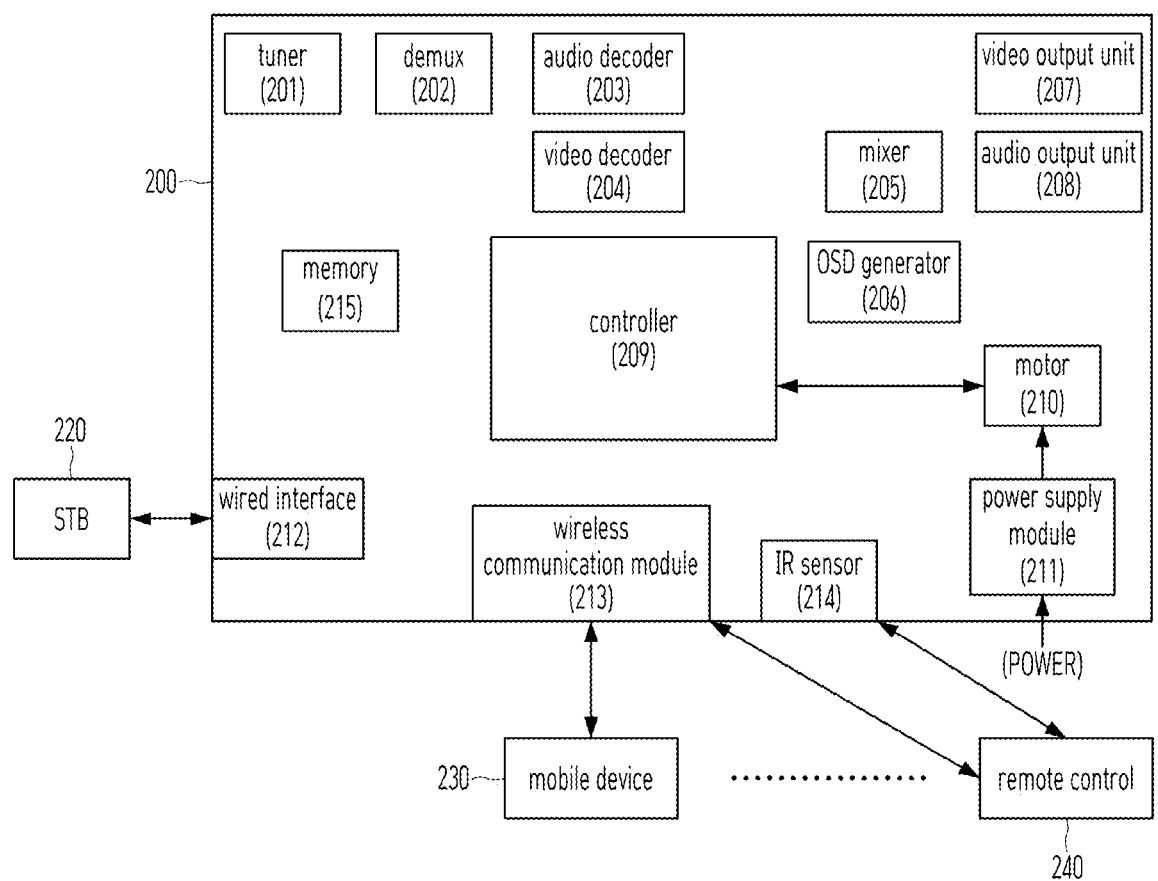
FIG. 2 illustrates external devices and internal components of a TV according to another embodiment of the disclosure.

FIG. 2 illustrates external devices and internal components of a TV according to another embodiment of the disclosure. It is also possible for those skilled in the art may combine some components to implement the disclosure, referring to FIGS. 2 and 3. For example, the baseband processor 120 and the middleware 130 illustrated in FIG. 1 may be included in a controller 209 illustrated in FIG. 2.

While a TV 200 illustrated in FIG. 2 includes various components, the scope of the disclosure is not limited thereto and should be defined in accordance with the appended claims.

Further, the internal components of the TV 200 illustrated in FIG. 2 may be controlled through the controller 209 and directly or indirectly connected to each other. That is, although not shown in FIG. 2, all of the internal components of the TV 200 illustrated in FIG. 2 are designed to be able to directly or indirectly transmit and receive control signals and/or data.

First, a tuner 201 receives a broadcast signal through an antenna or the like, and a demux or demultiplexer 202 demultiplexes the broadcast signal into audio data and video data.

An audio decoder 203 decodes the audio data (which has been encoded) included in the broadcast signal, and a video decoder 204 decodes the video data (which has been encoded) included in the broadcast signal.

The decoded audio data is output through an audio output unit 207. The audio output unit 207 may be, for example, a speaker attached to or spaced apart from the TV 200.

The decoded video data is output directly through a video output unit 208. Alternatively, a mixer 205 mixes menu data generated by an OSD generator 206 with the video data and transmits the mixed data to the video output unit 208.

A memory 215 stores various control data and commands for controlling the TV 200, and the controller 209 may control all of the components in the TV by referring to the memory 215.

Further, the TV 200 transmits and receives data to and from various external devices in its vicinity by communicating with them. For example, the TV 200 receives video/audio data from an STB 220 via a wired interface 212, and the video/audio data is processed by the audio decoder 203 and the video decoder 204, respectively. Alternatively, the received video/audio data may be output directly through the audio output unit 207 and the video output unit 208 bypassing the decoders 203 and 204.

The TV 200 transmits and receives various data to and from a mobile device 230 (e.g., a portable phone/wearable device or the like) via a wireless communication module 213, and receives an IR signal from a remote control 240 through an IR sensor 214. Alternatively, the remote control 240 capable of Bluetooth communication such as BT transmits and receives various data to and from the TV via the wireless communication module 213.

Unlike a conventional TV, the TV 200 according to an embodiment of the disclosure further includes a motor 210 inside or outside the TV 200. Therefore, it is possible to freely control the area of an exposed screen of the TV 200 by using the motor 210 (more specific embodiments in this regard will be described in more detail below with reference to FIGS. 3 to 6). In contrast, the conventional TV suffers from the problem that a full screen of the same size is always exposed.

However, since additional power needs to be supplied to the motor 210 through a power supply module 211 in an embodiment of the disclosure unlike the prior art, it is important to minimize power consumption by optimally controlling the motor, and defining specific information to be displayed according to the area of the exposed screen of the TV is required as a very important interface technology. As described above, the above technical requirements do not need to be considered for the conventional TV because the full screen of the same size is always exposed.

Figure 3:
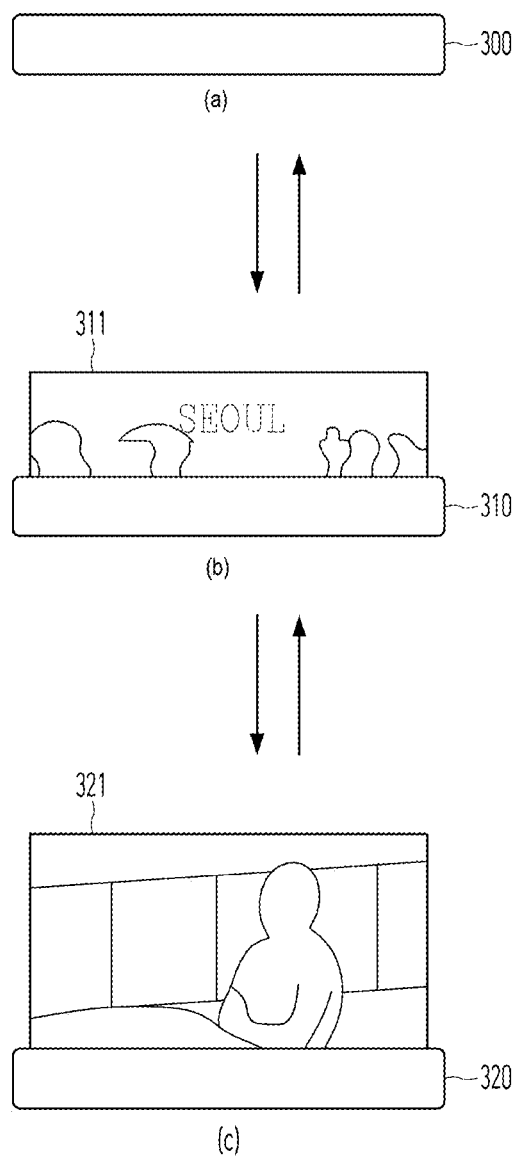
FIG. 3 illustrates the exterior of a TV according to an embodiment of the disclosure.

FIG. 3 illustrates the exterior of a TV according to an embodiment of the disclosure.

Unlike the prior art, a screen of a TV according to an embodiment of the disclosure is included within a housing 300, as illustrated in FIG. 3(*a*). Further, the TV is designed such that when a specific condition is satisfied (e.g., when a signal from pressing a power button of a remote control once is applied), only a portion of a screen 311 of the TV is exposed from a housing 310, as illustrated in FIG. 3(*b*). Further, the TV is designed such that when another specific condition is satisfied (e.g., when a signal from pressing the power button of the remote control twice is applied), a screen 321 of the TV is fully exposed from a housing 320, as illustrated in FIG. 3(*c*). Obviously, it is possible to reversely switch from the mode illustrated in FIG. 3(*c*) to the modes illustrated in FIG. 3(b) and FIG. 3(c) of FIG. 3, and it is also possible to skip the step (b).

To implement this, the screen 321 of the TV is formed of a material enabling a flexible display. For example, a flexible display material that allows for bending and twisting is a plastic OLED (POLED or P-OLED), which is covered with a colorless polyimide (CPI) film as a plastic material. Although the CPI film is transparent like glass, it is a hard plastic material, variable freely in shape, and not easily cracked under pressure.

Further, the screen 321 needs to be freely unfolded from a roller around which it is wound inside the housing 320, and a motor is required to drive the roller. This will be described in more detail below with reference to FIG. 6.

To distinguish from the prior art, a TV designed as illustrated in FIG. 3 may be defined as a rollable TV or a flexible TV, the mode illustrated in FIG. 3(a) may be defined as a zero view, the mode illustrated in FIG. 3(b) may be defined as a partial view, and the mode illustrated in FIG. 3(c) may be defined as a full view.

Figure 4:
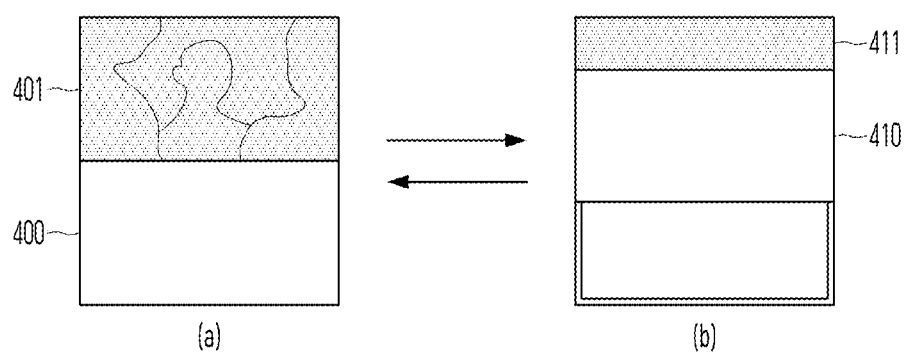
FIG. 4 illustrates the exterior of a TV according to another embodiment of the disclosure.

FIG. 4 illustrates the exterior of a TV according to another embodiment of the disclosure.

While it has been described with reference to FIG. 3 that a material enabling a flexible display is used for a TV screen, the TV screen does not necessarily have to use a material enabling a flexible display, and a regular TV screen may be used in the embodiment of FIG. 4.

Compared to the prior art, however, a cover 400 of the same or similar size is designed to be located under a TV screen 401, as illustrated in FIG. 4(a). Then, when a specific condition is satisfied (e.g., when a signal from pressing a power button on a remote control once is applied), a cover 410 is designed to move in an upward direction, exposing only a portion of a TV screen 411, as illustrated in FIG. 4(b). Obviously, it is also possible to transition from the state in FIG. 4(b) to the state in FIG. 4(a). In order to freely move the cover illustrated in FIG. 4 in the upward/downward direction, a motor is designed to be located around the cover.

To distinguish from the prior art, a TV designed as illustrated in FIG. 4 may be defined as an atelier TV, the mode illustrated in FIG. 4(a) may be defined as a full view, and the mode illustrated in FIG. 4(b) may be defined as a line view.

Figure 5:
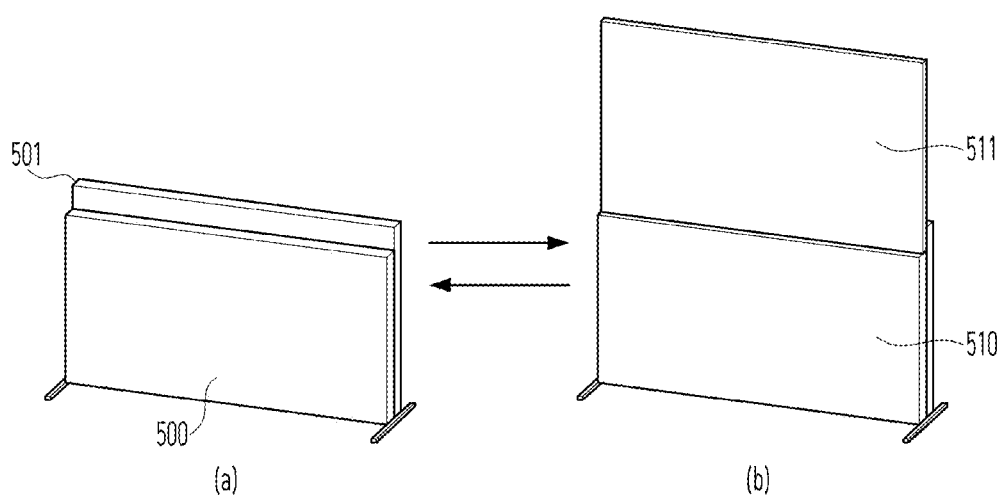
FIG. 5 illustrates the exterior of a TV according to another embodiment of the disclosure.

FIG. 5 illustrates the exterior of a TV according to another embodiment of the disclosure.

As in FIG. 4, a TV screen does not necessarily need to be made of a material enabling a flexible display, and a regular TV screen may be used. However, FIG. 5 differs from FIG. 4 in that the TV screen is moved instead of the cover.

For example, as illustrated in FIG. 5(a), a cover 500 of the same or similar size is designed to be located under a TV screen 501. The TV screen 501 and the cover 500 are spaced apart from each other by a specific distance to prevent friction between them. When a specific condition is satisfied (e.g., when a signal from pressing a power button on a remote control once is applied), a TV screen 511 is designed to move in the upward direction to be fully exposed, as illustrated in FIG. 5(b). Unlike FIG. 4, a cover 510 does not move.

Obviously, it is also possible to transition from the state of FIG. 5(b) to the state of FIG. 5(a). To freely move the TV screen illustrated in FIG. 5 in the upward/downward direction, a motor is designed to be located around the TV screen.

To distinguish from the prior art, a TV designed as illustrated in FIG. 5 may be defined as an interior TV, the mode illustrated in FIG. 5(a) may be defined as a partial view, and the mode illustrated in FIG. 5(b) may be defined as a full view.

FIG. 6 illustrates a motor for adjusting a screen size of a TV according to an embodiment of the disclosure.

While the motor may also be applied to the embodiments of FIGS. 4 and 5, FIG. 6 will be described based on the assumption that the motor is applied to the TV of FIG. 3, for ease of description.

FIG. 6(a) is an oblique view illustrating the housing and the TV screen of FIG. 3. FIG. 6(b) illustrates a cross-section cut along line A-A' in FIG. 6(a).

As illustrated in FIG. 6(a), a TV system 100 may further include a housing 10.

The housing 10 may be configured to accommodate various components, and more specifically, for example, a screen 30 and various electronic components for operating the screen 30.

The TV system 100 may further include a roller 20 rotatably installed within the housing 10, as illustrated in FIG. 6(b). Although not shown, the roller 20 may include sleeves formed at both ends thereof, and these sleeves may be rotatably supported with respect to the housing 10 by bearings.

Further, the roller 20 may also be connected to a motor 21 installed within the housing 10 and rotated by the motor 21 in a clockwise direction R1 or counterclockwise direction R2, as illustrated. Further, a gear train may be interposed between the motor 21 and the roller 20 in order to adjust a rotation speed of the roller 20.

The TV system 100 may include the screen 30 configured to display various types of content and information related to the content. For example, the screen 30 may display video content, audio content, and other auxiliary content. Further, the content may include various pieces of information associated with the content, such as the running time of video content, the title of content, and so on.

Further, the screen 30 may be accommodated within the housing 10 so that the TV system 100 may have a compact structure, as illustrated. For such accommodation within the housing 10, the screen 30 may basically need to be deformed. Therefore, the TV system 100 may use a flexible display as the screen 30.

In view of the deformable nature, the screen 30 may be rolled around the roller 20, as illustrated in FIG. 6(b). Further, depending on a rotation direction of the roller 20, the screen 30 may be wound on the roller 20 or unwound from the roller 20. As the screen 30 is unwound from the roller 20, the screen 30 may be projected or expanded/rolled out to the outside of the housing 10. Conversely, as the screen 30 is wound onto the roller 20, the screen 30 may be retracted/rolled into the housing 10. More specifically, as illustrated in FIG. 6(b), when the roller 20 is rotated in the clockwise direction R1, the screen 30 may be unwound from the roller 20 and expanded to the outside of the housing 10 through an opening 11 formed on the housing 10.

Therefore, the screen that was accommodated within the housing 300 in FIG. 3(a) may be expanded to the outside of the housing 310 and form the screen 311 of a predetermined size, as illustrated in FIG. 3(b). Furthermore, as the roller 20 is further rotated in the clockwise direction R1, the screen 30 may be further released from the roller 20. Accordingly, the screen may be projected to the outside of the housing 10 to a larger size, and form a screen of a larger size, as illustrated in FIG. 3(c). On the contrary, when the roller 20 is rotated in the counterclockwise direction R1, the screen 30 may be wound on the roller 20 and retracted into the housing 10 through the opening 11. Accordingly, the screen 321 of FIG. 3(c) may be retracted into the housing 310 to have a smaller size, thereby forming the screen of the smaller size, as illustrated in FIG. 3(b). Further, as the roller 20 is further rotated in the counterclockwise direction R2, the screen 30 may be further wound onto the roller 20. Thus, the screen may not be projected to the outside of the housing 300, and may be fully accommodated within the housing 300, as illustrated in FIG. 3(a).

In the TV system 100, the front of the expanded screen 30 may be protected by a window, while the rear of the screen 30 may be exposed. Since the screen 30 includes sensitive electronic components and substrates, it should be appropriately protected to prevent failure. Accordingly, as illustrated in FIG. 6(b), the TV system 100 may include a cover 40 configured to cover the rear of the expanded screen 30.

The cover 40 may include a plurality of interconnected links. Further, the links may have a width corresponding to a width of the screen 30, and the interconnected links, that is, the cover 40 may form a single plate covering the rear of the screen 30. Since any one of the links may be pivotable with respect to any other neighboring link, the cover 40 may be wound on a first roller 41 and guided up to the rear of the screen 30 by a second roller 42.

When the screen 30 is expanded during operation of the TV system 100, the first roller 41 may rotate to unwind the cover 40. The unwound cover 40 is then attached to the rear of the screen 30, while being guided by the second roller 41. Accordingly, as the cover 40 is expanded to the outside of the housing 10 along with the screen 30, the cover 40 may protect the rear of the screen 30.

On the other hand, when the screen 30 is retracted, the first roller 41 may rotate in an opposite direction to separate the cover 40 from the screen 30, and the separated cover 40 may be wound on the first roller 41, while being guided by the second roller 42. In the cover 40, the first roller 41 may be driven along with the roller 20 by the motor 21, and a separate motor for driving the first roller 41 may also be installed within the housing 10.

Further, the screen 30 may be difficult to maintain in an expanded state due to its flexibility. Therefore, the TV system 100 may include a support 50 configured to support the expanded screen 30. The support 50 may be expanded to the outside of the housing 10 through the opening 11 by a motor 51 and an auxiliary support 52 connected to the support 50. Accordingly, the support 50 may be expanded together with the screen 30 to the outside of the housing 10. Therefore, the screen 30 expanded by the support 50 may display content to a user, while being stably supported.

FIG. 7 illustrates an embodiment in which with a portion of a screen of a TV exposed, different content is displayed to a different user according to an embodiment of the disclosure.

While TVs illustrated in FIGS. 7 to 15 correspond to the afore-described TV of FIG. 5, the disclosure is not necessarily limited thereto, and the same thing is equally applicable to the TV illustrated in FIG. 3 or 4, which is capable of selectively exposing a portion or all of a screen.

As illustrated in FIG. 7(a), a TV according to an embodiment of the disclosure controls a motor to expose only a portion 710 of a screen. Then, with only the portion 710 of the screen exposed, the TV displays any content (e.g., current time information and weather information, and so on). The remaining portion of the screen except for the exposed portion 710 of the screen remains covered by a cover 720. Unlike a conventional TV, the state illustrated in FIG. 7 may be referred to as a partial view, as described above.

In this case, when the TV according to an embodiment of the disclosure detects a specific event (e.g., a specific user is located in the vicinity of the TV or when it is estimated that a specific user intends to control the TV), the TV displays content customized for the user on the exposed portion 711 of the screen, while maintaining the partial view (i.e., the state in which the cover 721 covers the screen partially). The customized content may correspond to, for example, a favorite application (e.g., an application related to news, fitness, or music) preset by the specific user. Alternatively, the favorite application may be automatically generated by the TV based on a device usage history of the user or time information.

However, one of the main features of the disclosure is a technique of automatically switching from the mode illustrated in FIG. 7(a) to the mode illustrated FIG. 7(b), after more accurately detecting a specific user located in the vicinity of the TV. This will be described in more detail below with reference to FIGS. 8 to 10.

Figure 8:
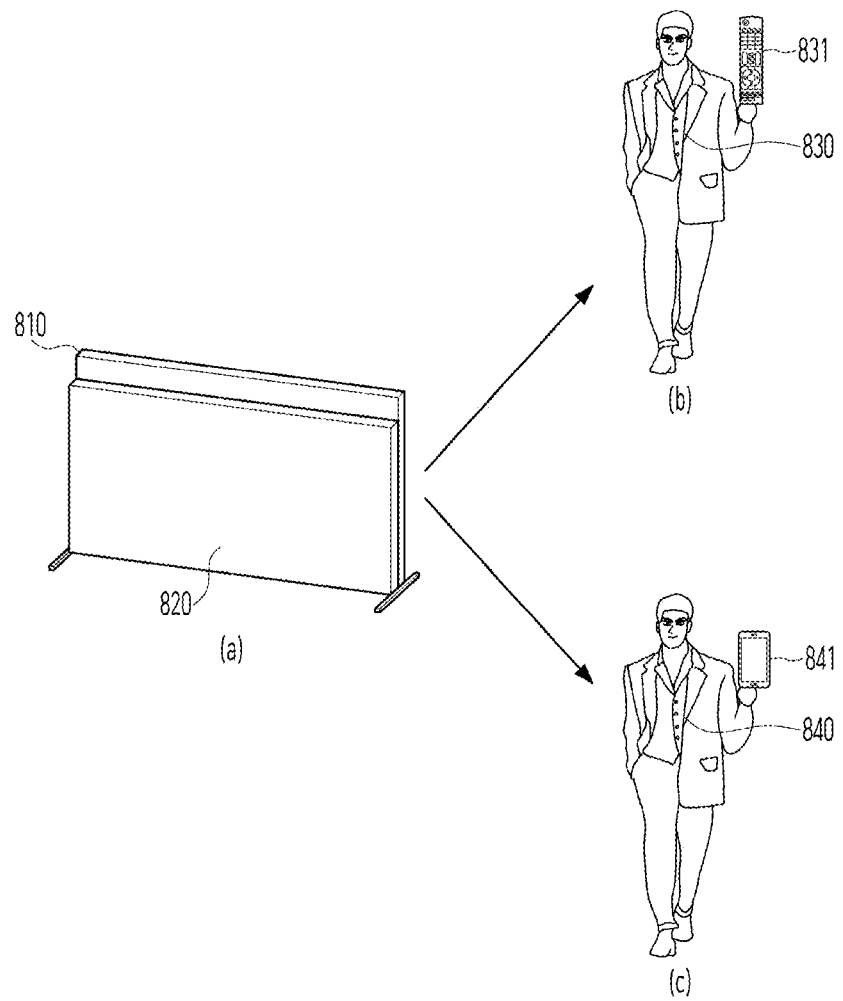
FIG. 8 separately illustrates a case in which with a portion of a screen of a TV exposed, a user with a remote control or a portable phone is in proximity according to an embodiment of the disclosure.

FIG. 8 separately illustrates a case in which with a portion of a screen of a TV exposed, a user holding a remote control or a portable phone is in proximity according to an embodiment of the disclosure.

As described above, the size of an exposed screen of a TV according to an embodiment of the disclosure is changed by a motor. First, as illustrated in FIG. 8(a), the TV controls the motor to expose only a portion 810 of a screen. In this case, an unexposed portion of the TV screen is covered by a cover 820. Accordingly, power does not need to be supplied unnecessarily to the entire TV screen.

Further, with only the portion 810 of the screen exposed, any content may be displayed.

When a specific condition (e.g., for a remote control illustrated in FIG. 8(b) or a portable phone illustrated in FIG. 8(c)) is satisfied referring to first data stored in a memory, the TV according to an embodiment of the disclosure starts shooting through a camera installed on the TV or outside of the TV.

The first data is used, for example, to distinguish between two situations.

First, when a communicatively connected device is a remote control, the first data includes information for detecting whether the remote control has been moved.

Second, when the communicatively connected device is a portable phone, the first data includes information for identifying whether the portable phone is in proximity to the TV.

A database including the first data in the memory is illustrated as Table 1.

TABLE 1

| Type of communicatively connected external device | Criterion for determining specific condition |
|---|---|
| Portable phone type | Determine whether the device is in close proximity based on signal strength |
| Remote control type | Determine whether the remote control moves by motion detection sensor |

Further, the TV according to an embodiment of the disclosure identifies a specific user in the vicinity of the TV, referring to second data stored in the memory and the result of the above shooting.

The second data may include, for example, facial feature information about pre-captured users (e.g., family members of a house where the TV is installed).

The TV according to an embodiment of the disclosure changes content displayed with only the 810 portion of the screen exposed or controls the motor to expose all of the screen, according to the identified specific user.

FIG. 8(*b*) is based on the assumption that a user 830 holding a remote control 831 is located in the vicinity of the TV. In this case, the content displayed on the portion 810 of the screen is automatically changed. A specific data processing scheme for implementing this will be described in more detail with reference to FIG. 9 below.

Further, FIG. 8(*c*) is based on the assumption that a user 840 holding a portable phone 841 is located in the vicinity of the TV. In this case, content displayed on the portion 810 of the screen is automatically changed. A specific data processing scheme for implementing this will be described in more detail with reference to FIG. 10 below.

Figure 9:
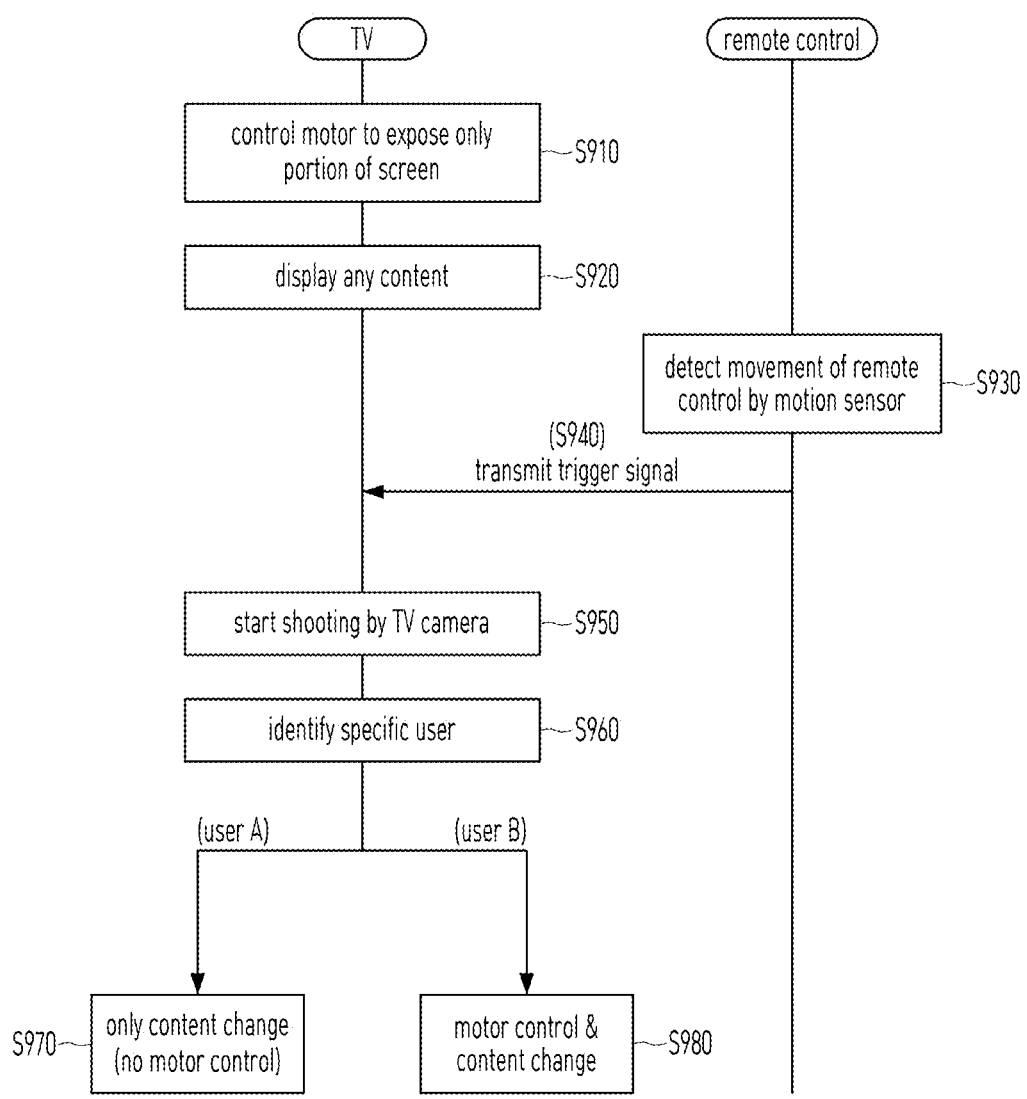
FIG. 9 is a flowchart illustrating processing of related data by a TV, when the user holds the remote control in FIG. 8.

FIG. 9 is a flowchart illustrating processing of related data by a TV, when the user holds the remote control in FIG. 8.

The TV according to an embodiment of the disclosure controls the motor to expose only a portion of the screen (S910). Further, the TV displays any content, while only the portion of the screen is exposed (S920).

When a specific condition for an external device (e.g., the remote control) is satisfied referring to the first data stored in the memory (as described above with reference to FIG. 8), the TV according to an embodiment of the disclosure starts shooting through the camera installed on the TV (S950).

To additionally describe a case in which the specific condition is satisfied, it is further assumed that the remote control and the TV are wirelessly connected to each other by short-range communication, such as Bluetooth.

When movement of the remote control is detected by a motion sensor of the remote control (S930), the remote control determines that the specific condition is satisfied, and transmits a trigger signal to the TV to instruct the TV to start shooting by the TV camera (S940).

Further, the TV according to an embodiment of the disclosure identifies a specific user, referring to the second data stored in the memory (as described above with reference to FIG. 8) and a result of the shooting (S960).

Finally, depending on the identified specific user, the TV according to an embodiment of the disclosure changes the content displayed with only the portion of the screen exposed (S970) or controls the motor to expose all of the screen (S980). The motor is not controlled for the specific user who has moved the remote control in the vicinity of the TV in step S970, thereby meeting user needs and reducing power consumption caused by unnecessary motor control.

Figure 10:
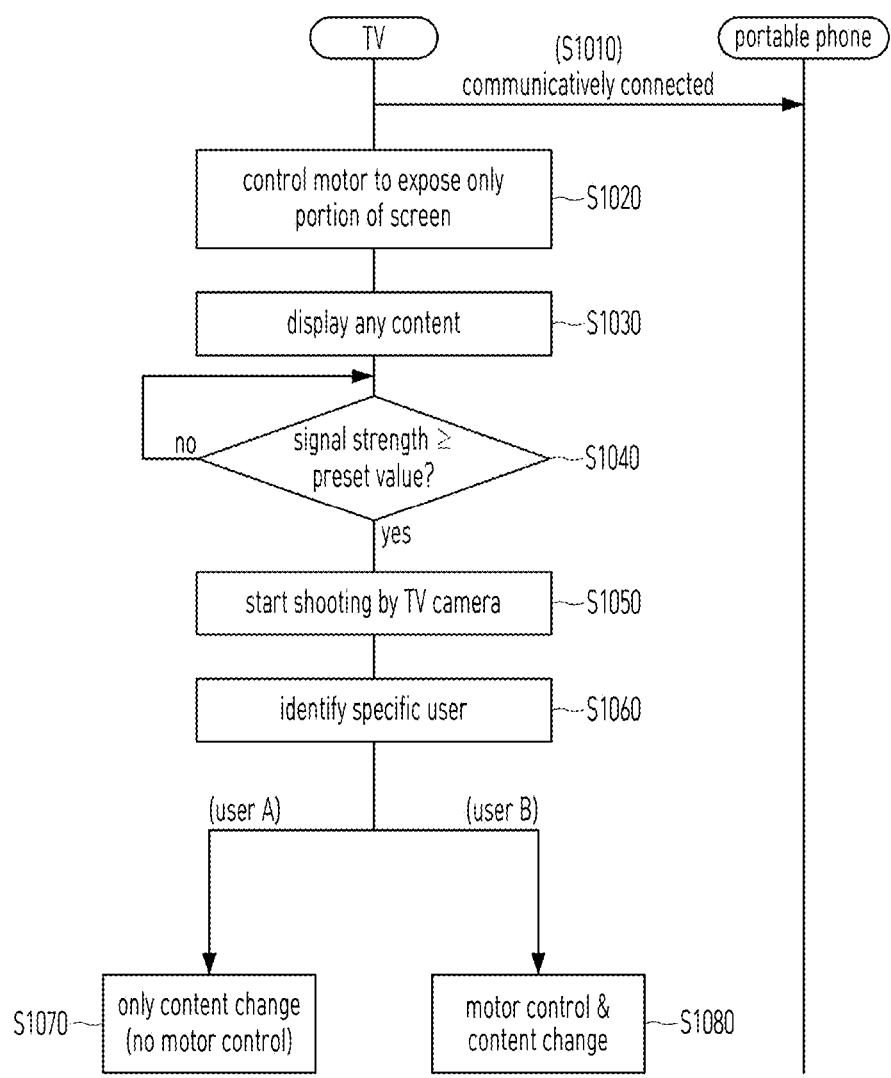
FIG. 10 a flowchart illustrating processing of related data by a TV, when the user carries the portable phone in FIG. 8.

FIG. 10 is a flowchart illustrating processing of related data by a TV, when the user holds the portable phone in FIG. 8.

First, it is assumed that the TV according to an embodiment of the disclosure and the portable phone are wirelessly connected to each other through short-range communication, such as Bluetooth.

Further, the TV controls the motor to expose only a portion of the screen (S1020). Further, with only the portion of the screen exposed, the TV displays any content (S1030).

The TV determines whether the strength of a signal transmitted to and received from the portable phone is equal to or greater than a preset threshold (S1040).

When the signal strength is equal to or greater than the preset threshold, the TV estimates that a user is located in the vicinity, and starts shooting by controlling the camera installed on the TV or the external camera (S1050).

Further, the TV according to an embodiment of the disclosure identifies the specific user, referring to the second data stored in the memory (as described above with reference to FIG. 8) and a result of the above shooting (S1060).

Finally, depending on the identified specific user, the TV according to an embodiment of the disclosure changes the content displayed with only the portion of the screen exposed (S1070) or controls the motor to expose the entire screen (S1080). The motor is not controlled for a specific user who has moved the remote control in the vicinity of the TV in step S1070, thereby meeting user needs and reducing power consumption caused by unnecessary motor control.

With reference to FIG. 10, the signal strength determination S1040 and the camera shooting S1050 have been described as a solution for identifying a user carrying a portable phone in the vicinity of the TV according to an embodiment of the disclosure. This design has the technical effect of identifying a case in which user B is in the vicinity of the TV, carrying a portable phone that user A owns. However, it is also within another scope of the disclosure to omit step S1050 and assume that a portable phone detected in the vicinity of the TV belongs to an owner based on portable phone identification information.

With reference to FIGS. 7 to 10, it has been mainly described that a user located in the vicinity of the TV according to an embodiment of the disclosure is identified, and a favorite application or the like is displayed in a partial view of a TV screen according to the identified user. However, according to another embodiment of the disclosure, it is possible to provide different content in the partial view or automatically switch from the partial view to the full view by controlling the motor of the TV, based on a different condition (e.g., a life cycle or the like) for a single identified user, as a design with more depth. This will be described in more detail below with reference to FIGS. 11 to 14.

FIG. 11 illustrates an embodiment in which content displayed on a portion of a screen of a TV is changed based on user history information.

In an embodiment of the disclosure, the TV receives schedule information or history information about a user from an external device (e.g., a portable phone), a cloud server, or the like. For example, a specific user sets a schedule on a portable phone to work from home starting at 7:00 a.m. every day, and transmits the information to the TV directly or through a server or the like.

When a specific user with a portable phone or a remote control is not located in the vicinity of a TV, time information and date information are displayed on a portion 1110 of a screen of the TV, as illustrated in FIG. 11(*a*).

On the other hand, when the specific user with the portable phone or the remote control is located in the vicinity of the TV (a method of determining this will be described in detail with reference to FIGS. 8 to 10), content based on the schedule/history information about the specific user is designed to be displayed on a portion 1120 of the screen of the TV, as illustrated in (b) of FIG. 11.

While not shown in FIG. 11, when the specific user moves away from the TV, carrying the portable phone, the basic information illustrated in FIG. 11(*a*) is again displayed. However, this may be applicable, only when the presence of the specific user in the vicinity of the TV is determined based on the strength of communication with the portable phone, not based on movement of the remote control.

FIG. 12 illustrates an embodiment in which content displayed on a portion of a screen of a TV is changed based on exercise information obtained from an external device. In the preceding drawings, only a remote control and a portable phone have been exemplarily described as external devices for determining the location of a user in the vicinity of a TV according to an embodiment of the disclosure. However, the disclosure may also be extended to a case in which a user wearing a wearable device (e.g., a watch or the like) is located in the vicinity of a TV.

When a specific user with a portable phone, a remote control, or a wearable device is not in the vicinity of the TV, time information and date information are displayed on a portion 1210 of the screen of the TV, as illustrated in FIG. 12(*a*).

When the specific user wearing a wearable device (e.g., a smart watch or the like) is located in the vicinity of the TV (this may be determined based on the strength of a Bluetooth signal or the like, relying on a similar principle to the principle for the case of carrying a portable phone described above), content based on exercise information about the specific user (e.g., obtained through a sensor embedded in the wearable device and transmitted to the TV according to an embodiment of the disclosure) is designed to be displayed on a portion 1220 of the screen of the TV, as illustrated in FIG. 12(*b*).

While not shown in FIG. 12, when the specific user wearing the wearable device moves away from the TV, the TV again displays the basic information illustrated in FIG. 12(*a*).

Figure 13:
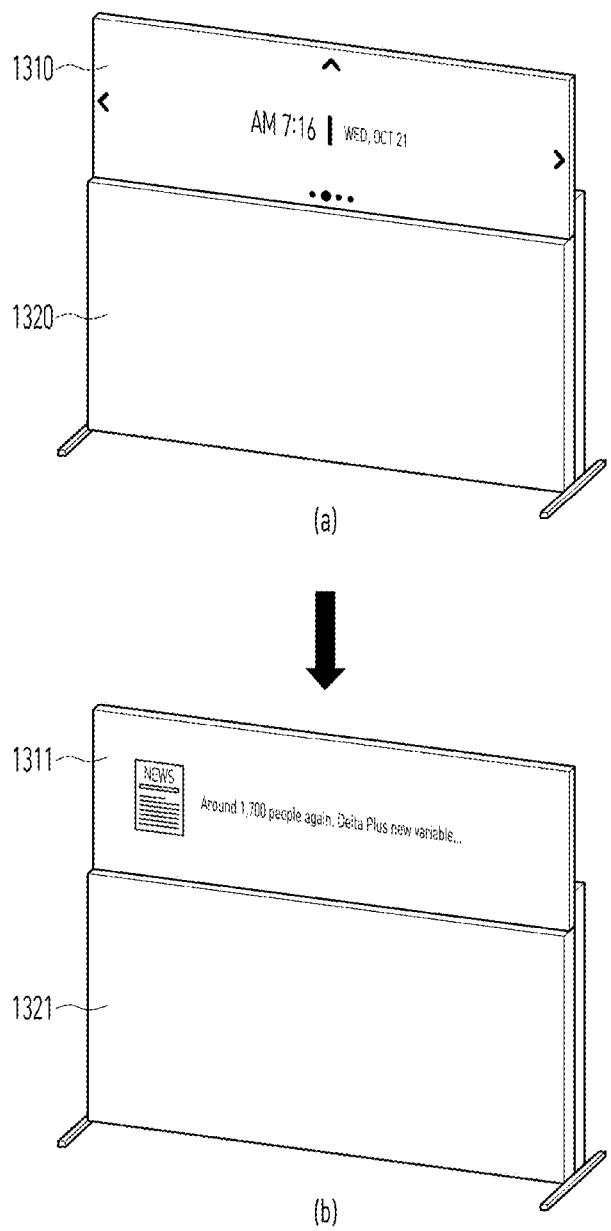
FIG. 13 illustrates an embodiment an embodiment of changing content displayed on a portion of a screen of a TV based on identified user information.
Figure 14:
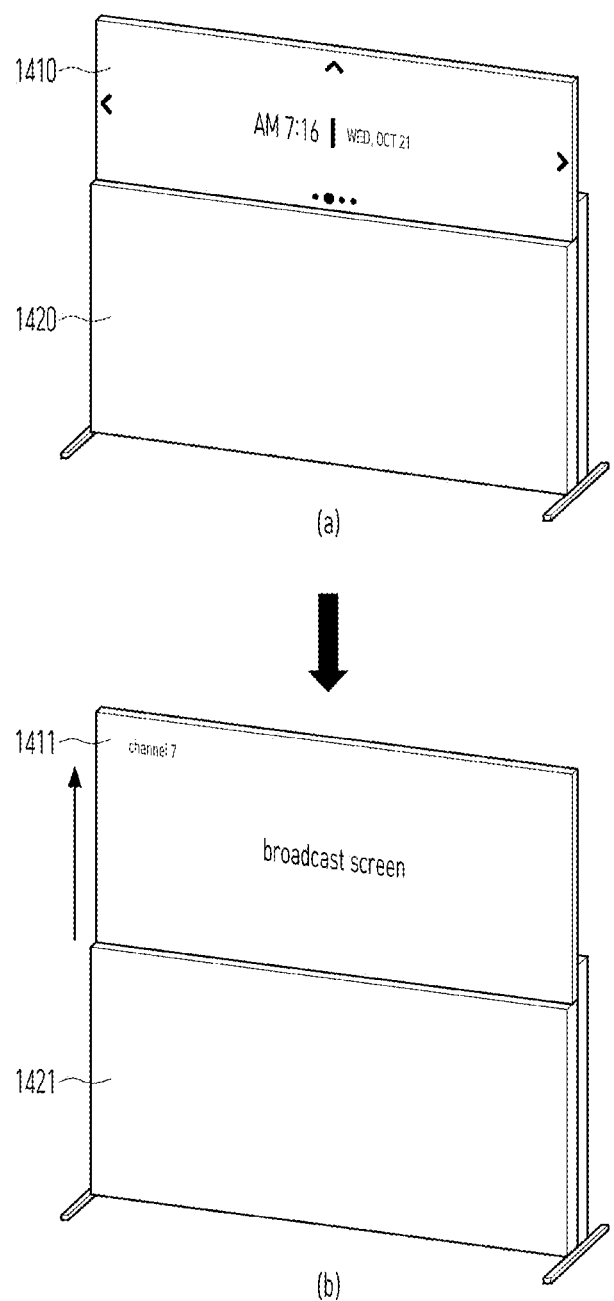
FIG. 14 illustrates an embodiment of changing the size of an exposed screen of a TV based on identified user information.

FIG. 13 illustrates an embodiment in which content displayed on a portion of a screen of a TV is changed based on identified user information. FIG. 14 illustrates an embodiment of changing the size of an exposed screen of a TV based on identified user information.

FIGS. 13 and 14 are based on the assumption that the same user is detected in the vicinity of the TV according to an embodiment of the disclosure. However, even when the same user is detected, the TV according to an embodiment of the disclosure may or may not control the motor.

First, the TV according to an embodiment of the disclosure identifies the user in the vicinity of the TV through the camera, as described above, and stores a TV usage history of the user by time in a database in the memory.

It is assumed by applying this technique that information indicating that user A takes no action from 7:00 a.m. to 8:00 a.m. after powering on the TV, and takes an action of changing a channel immediately from 7:00 p.m. to 8:00 p.m. after powering on the TV is stored in the memory.

As illustrated in FIG. 3(*a*), only basic information (e.g., time information, date information, and so on) is displayed with a portion 1310 of a screen exposed (a partial view), in the TV according to an embodiment of the disclosure. The remaining portion of the screen of the TV is covered by a cover 1320.

Upon detection of specific user A between 7:00 a.m. and 8:00 a.m., the TV briefly displays news or stock information in the form of tickers on a portion 1311 of a screen in the TV, as illustrated in FIG. 13(*b*). However, as in FIG. 13(*a*), a cover 1321 maintains the partial view in which it covers the remaining area of the TV screen.

Accordingly, this offers the technical effect of minimizing power consumption by not controlling the motor based on the time zone-based TV usage history of user A.

On the other hand, as illustrated in FIG. 14(*a*), only the basic information (e.g., time information, date information, and so on) is displayed with a portion 1410 of a screen exposed (a partial view), in the TV according to an embodiment of the disclosure. The other portion of the screen of the TV is covered by a cover 1420.

FIG. 14 differs from FIG. 13 in that the former is based on the assumption that the same user A is detected by the TV between 7:00 p.m. and 8:00 p.m. As illustrated in FIG. 14(*b*), the TV according to an embodiment of the disclosure controls a tuner to attempt to switch to any channel (or a preferred channel set by user A), while simultaneously controlling the motor to expand the screen as much as possible to a full view 1411. In contrast to FIG. 13(*b*), a cover 1421 does not cover the TV screen at all in FIG. 14(*b*).

Accordingly, even for the same user, user-desired content may be advantageously provided on a large screen by controlling the motor based on the time zone-based TV usage history of the user.

In order to implement FIGS. 13 and 14, third data of Table 2 below should be pre-stored in the memory of the TV.

TABLE 2

| Identified user | Time zone | Used content | Motor control/no motor control required |
|---|---|---|---|
| User A | 7-8 a.m. | Content A | No motor control required |
| User A | 7-8 p.m. | Content B | motor control required |
| User B | 10-11 a.m. | Content C | motor control required |
| User B | 9-10 p.m. | Content D | No motor control required |

Therefore, the TV according to an embodiment of the disclosure is capable of comparing the third data stored in the memory with current time and depending on the result of the comparison, controlling the motor to expose all or only a portion of the TV screen while executing a specific application.

The third data may refer to, for example, data in which the history of using the TV according to an embodiment of the disclosure by a specific user is mapped to time information.

Figure 15:
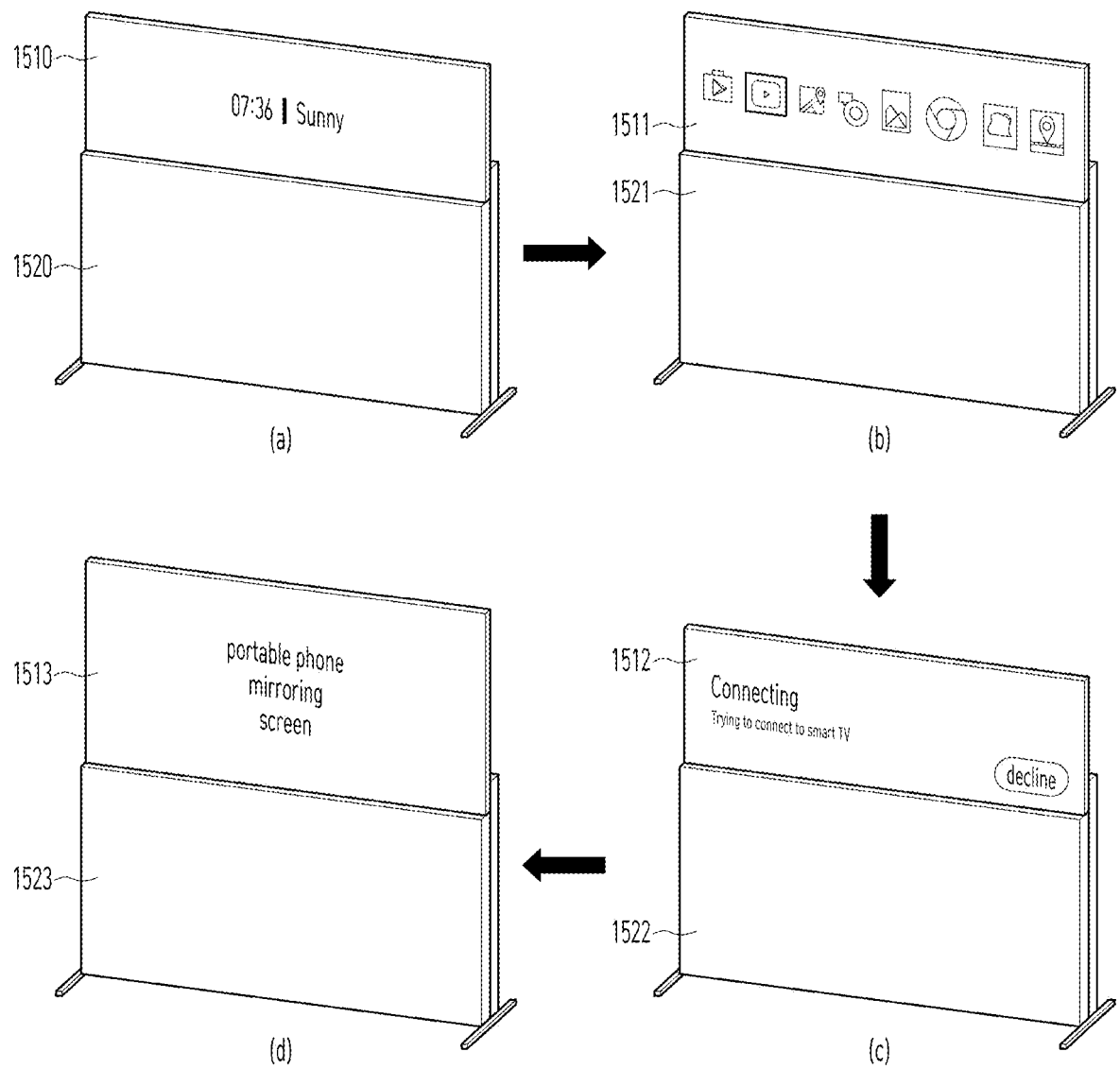
FIG. 15 illustrates an embodiment of changing the size of an exposed screen of a TV based on communication with a portable phone.

FIG. 15 illustrates an embodiment of changing the size of an exposed screen of a TV based on communication with a portable phone.

As illustrated in FIG. 15(*a*), the TV according to an embodiment of the disclosure displays time information and weather information, with only a portion 1510 of the screen exposed. The TV screen except for the exposed area maintains a partial view in which it is covered by a cover 1520.

When a user with a portable phone is in close proximity to the TV according to an embodiment of the disclosure, only some of applications of the communicatively connected portable phone are displayed on a portion 1511 of the TV screen, which is not covered by a cover 1521, as illustrated in FIG. 15(*b*). The applications displayed on the portion 1511 of the TV screen may be preset by the user or may be automatically filtered to frequently used applications.

When any of the applications displayed on the portion 1511 of the TV screen is selected, a notification message indicating that the application is connecting is displayed on a portion 1512 of the TV screen, as illustrated in FIG. 15(*c*), and at this time, the partial view is still maintained, in which a cover 1522 partially covers the TV screen.

Finally, the TV controls the motor to expose an entire screen 1513, leaving no area of the screen covered by a cover 1523, as illustrated in FIG. 15(*d*). However, while not shown in FIG. 15, it is also possible for the TV according to an embodiment of the disclosure, for example, to further determine whether to maintain the partial view or switch to the full view, depending on the type of the selected application in step (c) of FIG. 15.

More specifically, a design is made such that for example, when the selected application of the portable phone is suitable for display on a small-sized screen, the partial view is maintained, whereas only when the selected application of the portable phone is suitable for display on a large-sized screen, the partial view is switched to the full view. Accordingly, there is the technical effect of reducing unnecessary motor control and consequently power consumption.

Mode for Carrying Out the Invention

Various embodiments of the disclosure have been described in the preceding heading "Best Mode", and it will be apparent that combining embodiments described in two or more drawings as required by those skilled in the art also falls within the scope of the disclosure.

Industrial Applicability

The disclosure is applicable to TVs of various form factors including, for example, a rollable TV, and acknowledged to have industrial applicability.

The invention claimed is:

1. A method of controlling a television (TV) in which a size of an exposed screen is changed by a motor, the method comprising:
   controlling the motor to expose only a portion of the screen;
   with only the portion of the screen exposed, displaying any content;
   when a specific condition for an external device is satisfied referring to first data stored in a memory, starting shooting through a camera installed on the TV;
   identifying a specific user, referring to second data stored in the memory and a result of the shooting; and
   changing the content displayed with only the portion of the screen exposed or controlling the motor to expose all of the screen, according to the identified specific user,
   wherein controlling the motor further comprises:
   comparing third data stored in the memory with current time; and
   controlling the motor to expose all of the screen while executing a specific application, based on a result of the comparison.

2. The method of claim 1, wherein starting shooting comprises, when the external device corresponds to a remote control of the TV, determining that the specific condition is satisfied, only when movement of the remote control is detected by a motion sensor of the remote control.

3. The method of claim 1, wherein starting shooting comprises, when the external device corresponds to a portable phone, determining that the specific condition is satisfied, only when a strength of a signal between the portable phone and the TV is equal to or greater than a preset value.

4. The method of claim 1, wherein the third data means data in which a history of using the TV by the specific user is mapped to time information.

5. A television (TV) in which a size of an exposed screen is changed by a motor, comprising:
   a memory storing at least one data;
   the motor controlling to expose a portion of the screen;
   a video output module displaying any content, with only the portion of the screen exposed; and
   a controller controlling the memory, the motor, and the video output module,
   wherein the controller controls to start shooting through a camera installed on the TV, when a specific condition for an external device is satisfied referring to first data stored in the memory, controls to identify a specific user, referring to second data stored in the memory and a result of the shooting, and controls to change the content displayed with only the portion of the screen exposed or controls the motor to expose all of the screen, according to the identified specific user,
   wherein the controller compares third data stored in the memory with current time, and controls the motor to expose all of the screen while executing a specific application, based on a result of the comparison.

6. The TV of claim 5, wherein when the external device corresponds to a remote control of the TV, the controller determines that the specific condition is satisfied, only when movement of the remote control is detected by a motion sensor of the remote control.

7. The TV of claim 5, wherein when the external device corresponds to a portable phone, the controller determines that the specific condition is satisfied, only when a strength of a signal between the portable phone and the TV is equal to or greater than a preset value.

8. The TV of claim 6, wherein the third data means data in which a history of using the TV by the specific user is mapped to time information.

* * * * *